United States Patent [19]

Uchida

[11] Patent Number: 5,682,257
[45] Date of Patent: Oct. 28, 1997

[54] OPTICAL INTERFACE IN SONET SYSTEM

[75] Inventor: Tetsuya Uchida, Kawasaki, Japan

[73] Assignee: Fujitsu Limited, Kanagawa, Japan

[21] Appl. No.: 713,095

[22] Filed: Sep. 16, 1996

Related U.S. Application Data

[63] Continuation of Ser. No. 386,132, Feb. 9, 1995, abandoned, which is a continuation of Ser. No. 950,917, Sep. 24, 1992, abandoned.

[30] Foreign Application Priority Data

Sep. 25, 1991 [JP] Japan ................... 3-245394

[51] Int. Cl.⁶ .................... H04J 14/00; H04B 10/20
[52] U.S. Cl. ............................... 359/118; 370/113
[58] Field of Search ........................ 370/110.1, 110.4, 370/112, 113; 359/118

[56] References Cited

U.S. PATENT DOCUMENTS

| | | | |
|---|---|---|---|
| 4,713,806 | 12/1987 | Oberlander et al. | 370/58.2 |
| 5,042,062 | 8/1991 | Lee et al. | 370/58.2 |
| 5,189,410 | 2/1993 | Kosugi et al. | 359/117 |
| 5,189,673 | 2/1993 | Burton et al. | 370/58.2 |

*Primary Examiner*—Hezron E. Williams
*Assistant Examiner*—Richard A. Moller
*Attorney, Agent, or Firm*—Helfgott & Karas, P.C.

[57] ABSTRACT

An optical interface in a SONET system, wherein the optical interface includes a first multiplex/demultiplex apparatus for multiplexing/demultiplexing higher level signals of the main line side and lower level signals of the subscriber side and performing electrical/optical conversion of the lower level electrical signals and optical signals. An optical transmission line is provided for transmitting the optical signals. A second multiplex/demultiplex apparatus converts between the optical signals and a plurality of subscriber side line digital electrical signals. The overhead signals contained in the lower level signals and reaching the first multiplex/demultiplex apparatus are also contained in the optical signals and are transferred further from the first multiplex/demultiplex apparatus to the second multiplex/demultiplex apparatus.

8 Claims, 8 Drawing Sheets

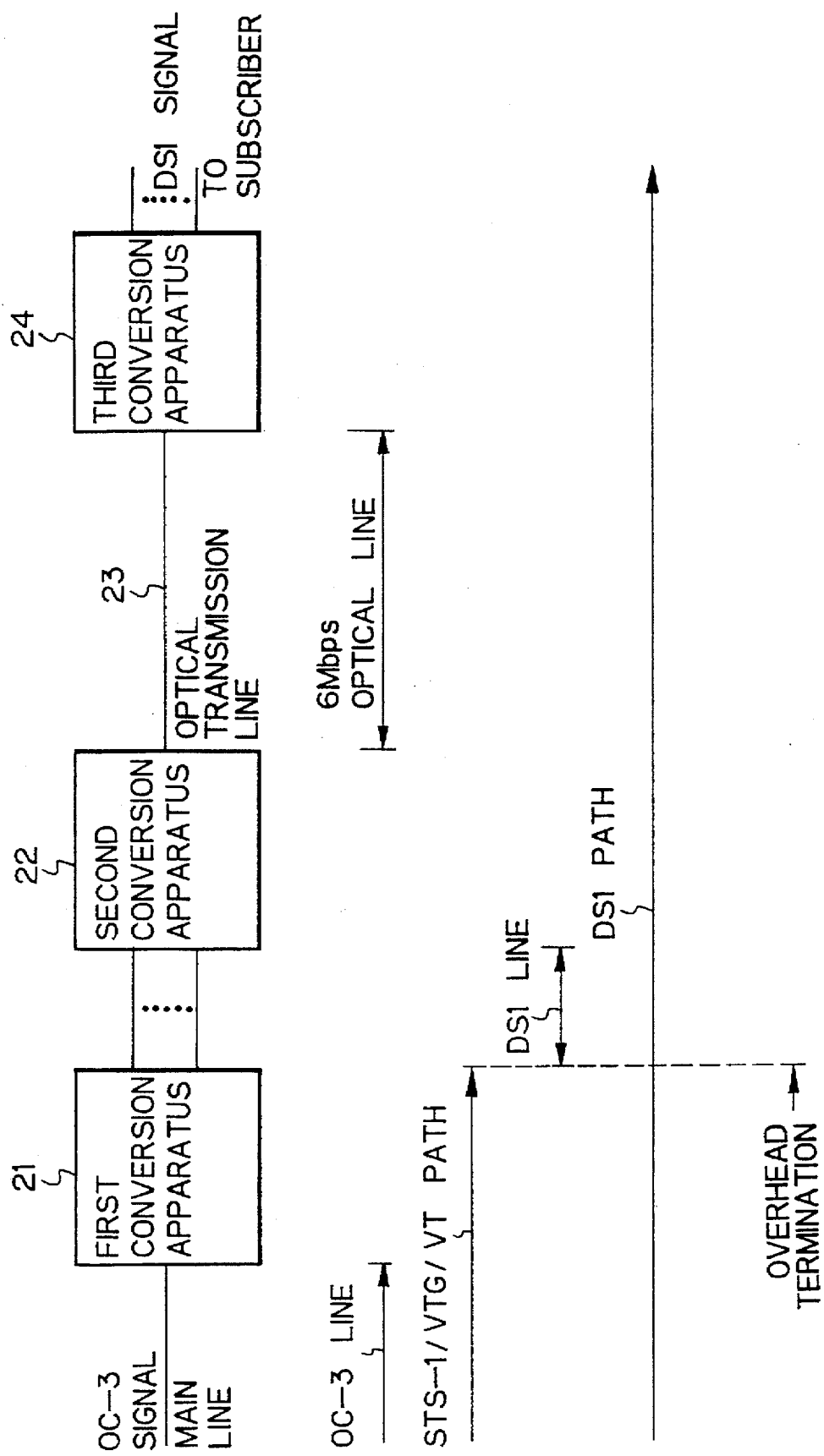

OPTICAL INTERFACE IN SONET SYSTEM

This is a continuation, of application Ser. No. 08/386,132, filed Feb. 9, 1995 which is in turn a continuation of application Ser. No. 07/950,917 filed Sep. 24, 1992 and now abandoned.

BACKGROUND OF THE INVENTION

1. Field of the Invention

The present invention relates to an optical interface formed in a synchronous optical network (SONET) system.

There is known an optical interface for converting lower signal level signals to optical signals so as to extend the transmission distance when transmitting information of a lower signal level group in an optical carrier (OC)-3 transmission apparatus.

In an OC-3 transmission apparatus of a SONET system, digital signals DS1 from the subscriber side are successively multiplexed and, at the same time, inserted with overhead signals to set up frames of a predetermined format and the resultant signals are converted to optical signals. This constitutes the main line route.

On the other hand, to drop signals from the main line route to small-sized exchange offices, business offices, etc., these signals, which correspond to several DS1 signals, are demultiplexed and the results are further converted to optical signals and transmitted to the desired locations.

The function of transmitting signals to their desired locations by optical signals is assumed by the above-mentioned optical interface.

2. Description of the Related Art

As explained in detail later, a conventional optical interface was comprised of a first conversion apparatus, a second conversion apparatus, and a third conversion apparatus connected to the second conversion apparatus through an optical transmission line. In this case, the first conversion apparatus which drops the DS1 signals from the main line route and the second conversion apparatus which converts the dropped DS1 signals to optical signals and outputs the same are connected by asynchronous DS1 signals. Therefore, the overhead signals on a path of SONET format signals like virtual tributary (VT) 1.5 signals or VT group (G) signals are terminated at the first conversion apparatus, so are not sent to the optical transmission line between the second conversion apparatus and the third conversion apparatus.

Therefore, there was the problem that it was not possible to construct a maintenance signal line or to construct a backup line by route switching using the overhead signal channels. Note that as a maintenance signal line using such an overhead signal channel, there is, for example, a performance monitor for monitoring the line quality of the VT1.5 signal path. Further, as a backup line, it is conceivable to construct a backup line by route switching at the VT1.5 signal path.

SUMMARY OF THE INVENTION

Therefore, the object of the present invention is, in consideration of the above-mentioned problems, to make possible transmission of overhead signals of the SONET system to the subscriber side of the optical interface and thus to enable the construction of a maintenance signal line and the construction of a backup line by route switching.

To attain the above object, the present invention provides an optical interface comprised of a first multiplex/demultiplex apparatus on the main line side, a second multiplex/demultiplex apparatus on the subscriber side, and an optical transmission line connecting the first and second multiplex/demultiplex apparatuses, characterized in that overhead signals received from the main line side are not terminated at the first multiplex/demultiplex apparatus, but are terminated in the second multiplex/demultiplex apparatus on the subscriber side.

BRIEF DESCRIPTION OF THE DRAWINGS

The above object and features of the present invention will be more apparent from the following description of the preferred embodiments with reference to the accompanying drawings, wherein:

FIG. 3 is a schematic block diagram of a conventional optical interface;

DESCRIPTION OF THE PREFERRED EMBODIMENTS

Before describing the embodiments of the present invention, the related art and the problems therein will be first described with reference to the related figures.

Figure 1:
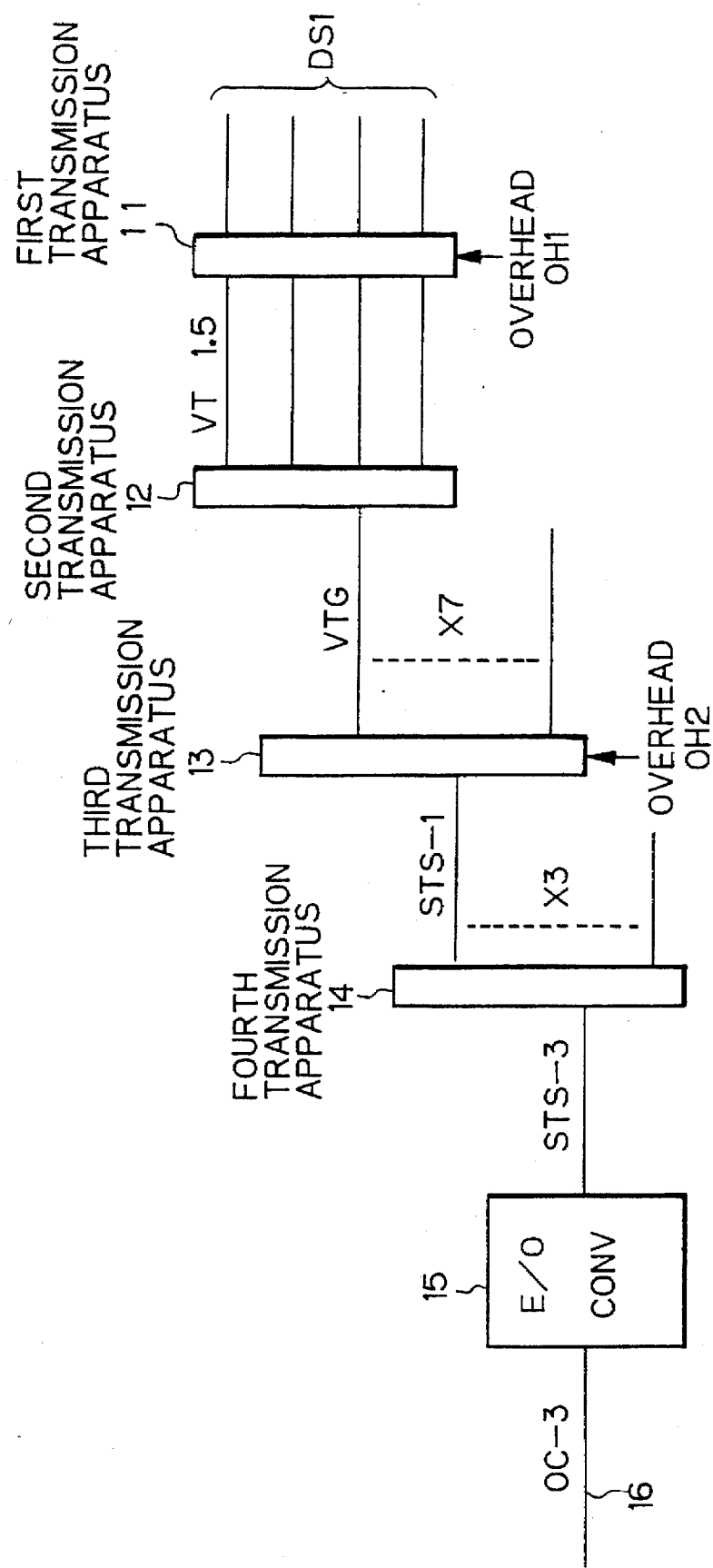
FIG. 1 is a view of the known architecture for SONET signals as defined by regulations.

FIG. 1 is a view of the known architecture for SONET signals as defined by regulations.

1.5 Mbps digital signals DS1 from subscribers are formed into frames at a first transmission apparatus 11 and predetermined overheads OH1 are inserted to produce VT1.5 frame signals. In a second transmission apparatus 12, several VT1.5 signals are multiplexed to produce VTG frame signals. In a third transmission apparatus 13, groups of seven VTG signals are multiplexed and predetermined overheads OH2 are inserted to produce synchronous transport signal (STS)-1 frame signals. In a fourth transmission apparatus 14, groups of three STS-1 signals are multiplexed to produce STS-3 frame signals. An electrical/optical conversion unit (E/O CONV) 15 converts the STS-3 signals to optical signals, forms OC-3 signals, and sends them to an optical transmission line 16.

The signals from the optical transmission line 16, that is, the signals from the main line side, are demultiplexed in an order opposite to the above and reach the subscriber side. The overheads OH1 and OH2 are illustrated in FIG. 2A and FIG. 2B.

Figure 2A:
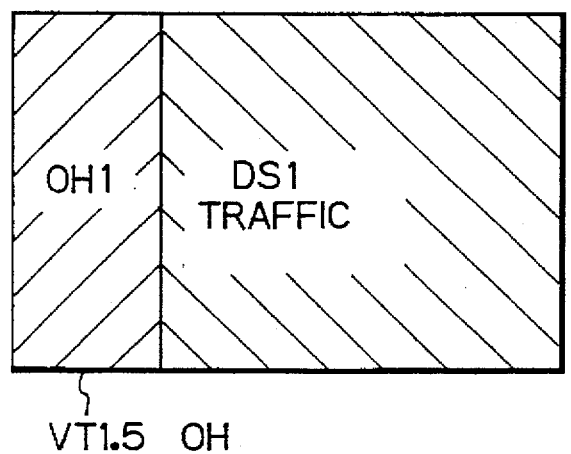
FIG. 2A is a view of the mapping of an overhead OH1.
Figure 2B:
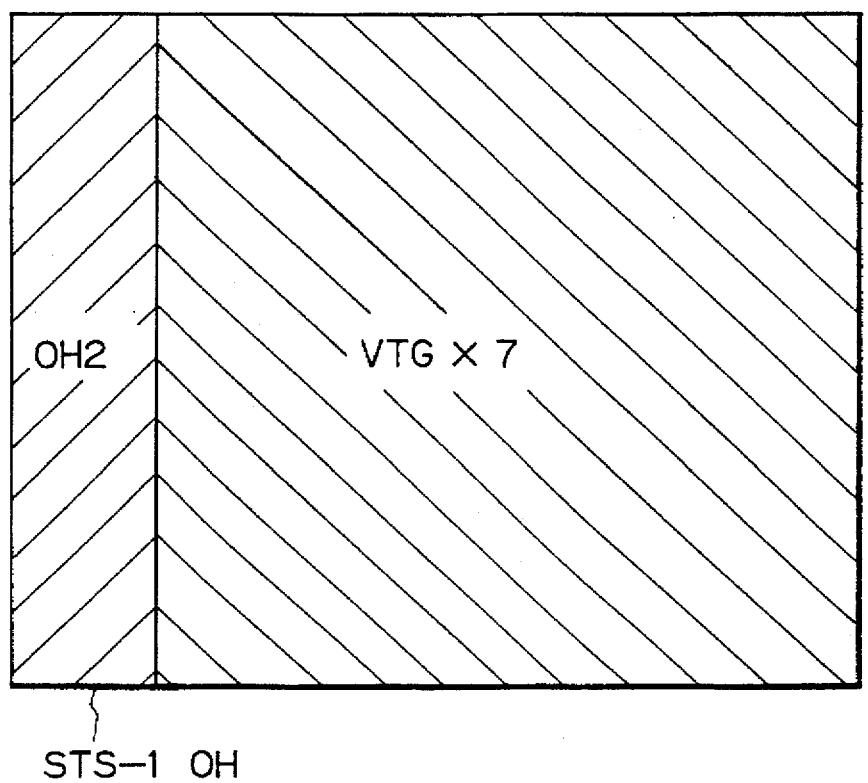
FIG. 2B is a view of the mapping of an overhead OH2.

FIG. 2A is a view of the mapping of an overhead OH1, and FIG. 2B is a view of the mapping of an overhead OH2. In FIG. 2A, in addition to the inherent DS1 traffic bits, a VT1.5 signal path overhead is mapped as OH1 in the illustrated frame. Four of the frames, for example, shown in FIG. 2A are multiplexed to produce a VTG frame signal.

Seven of the VTG frames, for example, are multiplexed to produce the frame of an STS-1 signal. This is shown in FIG. 2B. The path overhead of the STS-1 signal in FIG. 2B is mapped as OH2. Note that the OH1 shown in FIG. 2A is buried inside the frame shown by VTGX7 of FIG. 2B.

FIG. 3 is a schematic block diagram of a conventional optical interface. By using this optical interface, it is possible to efficiently drop signals from the main line route to small-sized exchange offices, business offices, etc.

In FIG. 3, the first conversion apparatus 21 demultiplexes and drops several DS1 signals from the signals of the main line route with a relatively large capacity, such as the OC-3 signals. The second conversion apparatus 22 converts the thus dropped DS1 signals to 6 Mbps optical signals and sends them to the optical transmission line 23. The third conversion apparatus 24 converts these optical signals to electrical signals and outputs a plurality of DS1 signals. In the figure, the first conversion apparatus 21 corresponds to the architecture of FIG. 1.

In the optical interface shown in FIG. 3, the signals of the main line route, that is, the OC-3 line, are terminated at the input side of the first conversion apparatus 21. The paths of the STS-1 signals obtained by converting the OC-3 signals and demultiplexing the same, the VTG signals obtained by demultiplexing the STS-1 signals, and the VT1.5 signals obtained by demultiplexing the same are terminated in the first conversion apparatus 21. The first conversion apparatus 21 and the second conversion apparatus 22 are connected by a DS1 line. The second conversion apparatus 22 and the third conversion apparatus 24 are connected by a 6 Mbps optical line (23). Therefore, the main line route and the output side of the conversion apparatus 24 are connected by the DS1 path.

In the optical interface of FIG. 3, not only the VT1.5 signals, but also the overhead signals in the path of the VTG signals are terminated inside the first conversion apparatus 21 as mentioned above, so there is no way for any overhead signals to exist in the lower signal level signals from the first conversion apparatus 21 and it is not possible to send overhead signals from the second conversion apparatus 22 to the subscriber side. As a result, the problem mentioned earlier arises.

Figure 4:
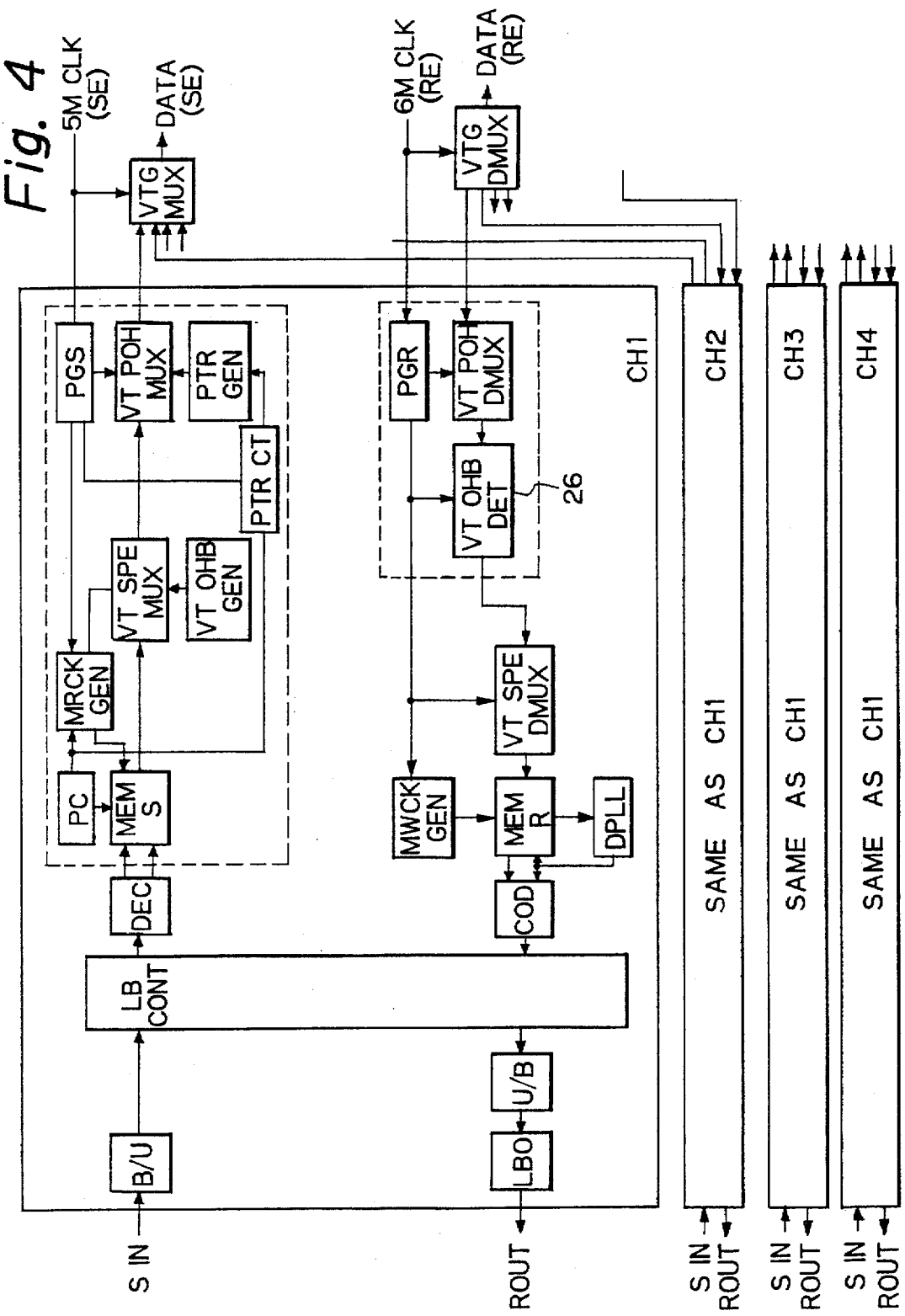
FIG. 4 is a circuit diagram of a known example of a terminating means of an overhead signal.

FIG. 4 is a circuit diagram of a known example of a terminating means of an overhead signal. The overhead signal is terminated in a detection circuit (VT overhead byte detector) for overhead signals. The figure, however, shows an example of the case of terminating an overhead signal of a VT signal. In the figure, explaining the references successively from the top right, PGS is a pulse generator of the send side, MRCK GEN is a memory read clock generator, PC is a phase comparator, LB CONT is a loopback controller, B/U is a bipolar/unipolar converter, SIN is a send-in signal, VT POH MUX is a VT path overhead multiplexer, VT SPE MUX is a VT synchronous payload envelopment multiplexer, PTR GEN is a pointer generator, VT OHB GEN is a VT overhead byte generator, PGR is a receive side pulse generator, MW CK GEN is a memory write clock generator, VT POH DMUX is a VT path overhead demultiplexer, VT SPE DMUX is a VT synchronous payload envelope demultiplexer, U/B is a unipolar/bipolar converter, LBO is a line build-out network, and ROUT is a receive-out signal.

Figure 5:
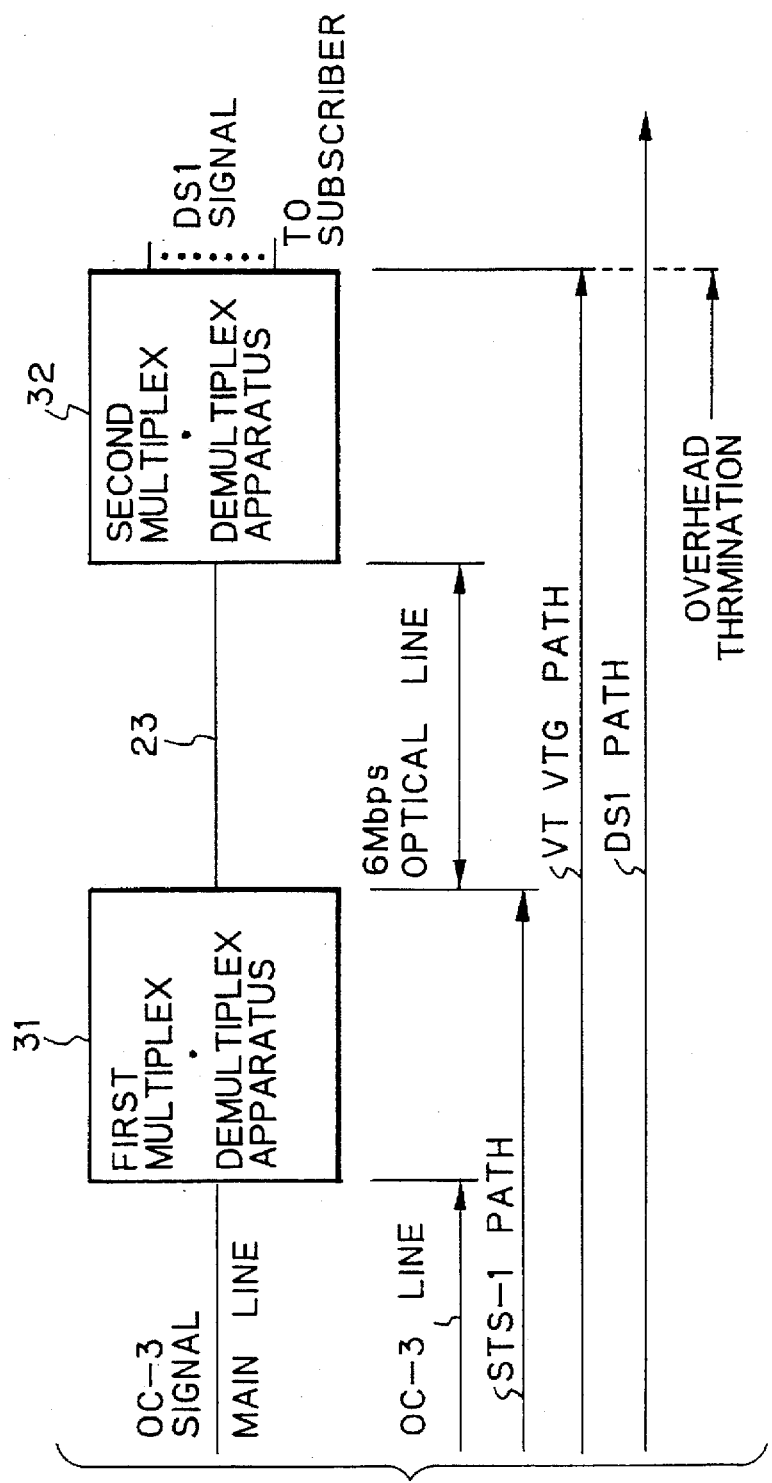
FIG. 5 is a basic constitutional view of an optical interface based on the present invention.

FIG. 5 is a basic constitutional view of an optical interface based on the present invention. The optical interface based on the present invention is comprised of an optical transmission line 23 and multiplex/demultiplex apparatuses 31 and 32 provided at its two ends. More specifically, the optical interface of the present invention is comprised of a first multiplex/demultiplex apparatus 31 for multiplexing/demultiplexing higher signal, level signals of the main line side and lower signal level signals of the subscriber side and performing electrical/optical conversion of the lower signal level electrical signals and optical signals; an optical transmission line 23 for transmitting the optical signals; and a second multiplex/demultiplex apparatus 32 for converting between the optical signals and a plurality of subscriber side line digital electrical signals; wherein the-overhead signals inserted in the lower signal level signals and reaching the said first multiplex/demultiplex apparatus 31 are included in the optical signals and are transferred further from the first multiplex/demultiplex apparatus 31 to the second multiplex/demultiplex apparatus 32. Therefore, the overhead signals for the lower signal level signals are sent into the second multiplex/demultiplex apparatus 32 by the optical signals on the optical transmission line 23.

Preferably, in the present invention, the signals of the lower signal level converted to optical signals are VTG signals in a SONET system.

According to the present invention, in the first multiplex/demultiplex apparatus 31, the higher signal level signals and the lower signal level signals in the SONET system are mutually multiplexed/demultiplexed, the lower signal level signals and optical signals are converted between them, an optical transmission line 23 is used to transmit the optical signals, and a second multiplex/demultiplex apparatus 32 is used to convert between the optical signals and a plurality of digital electrical signals, thereby forming an optical interface. Therefore, in this optical interface, it is possible to transmit overhead signals of the lower signal level signals by the optical signals.

More specifically, in the first multiplex/demultiplex apparatus 31, an electrical/optical conversion unit (see 41 in FIG. 6) is used to convert between the OC-3 signals and STS-3 signals in the SONET system, an STS-3 multiplex/demultiplex unit (see 42 in FIG. 6) is used to multiplex/demultiplex the STS-3 signals and STS-1 signals, an STS-1 multiplex/demultiplex unit (see 43 in FIG. 6) is used to multiplex/demultiplex between the STS-1 signals and VTG signals, an electrical/optical conversion unit (see 44 in FIG. 6) is used to convert between VTG signals and optical signals, and an STS-1 overhead control unit (see 46 in FIG. 6) is used to control the insertion/extraction of overhead signals in the STS-1 multiplex/demultiplex unit.

In the second multiplex/demultiplex apparatus 32, an electrical/optical conversion unit (see 51 in FIG. 7) is used to convert between the optical signals and the VTG signals. A VTG multiplex/demultiplex unit (see 54 in FIG. 7) is used to multiplex/demultiplex between the VTG signals and the VT1.5 signals. VT mapping units (see 55, 56 in FIG. 7) are used to convert between the VT1.5 signals and digital signals. A control unit (see 57 in FIG. 7) is used to control the conversion of formats in the VT1.5 mapping units and the insertion/extraction of overhead signals, thereby realizing the present invention. The point here is the provision of the VTG multiplex/demultiplex unit in the second multiplex/demultiplex apparatus 32.

Further, in this case, in the first multiplex/demultiplex apparatus 31, an electrical/optical conversion unit (see 45 in FIG. 6) is used to convert between the VTG signals and optical signals. In the second multiplex/demultiplex apparatus 32, an electrical/optical conversion unit (see 52 in FIG. 7) is used to convert between the optical signals and the VTG signals. A path switch (see 53 in FIG. 7) is used to select and connect the two electrical/optical conversion units (51, 52). The control unit controls the selection of the two electrical/optical conversion units in the path switch, so it is possible to switch routes of the optical signals by the overhead signals.

In the signal architecture of the SONET system, there is a VT1.5 signal, which is a 1.5 Mbps signal corresponding to the digital signal DS1. Further, there is a VTG signal, which is a signal obtained by multiplexing four of these VT1.5 signals. In the present invention, the VTG signals are converted as they are to optical signals to constitute an optical interface path, whereby it is made possible for the overhead signals of the VT1.5 signals and VTG signals to not be terminated inside the first multiplex/demultiplex apparatus 31, which is the apparatus at the input side of the optical interface, but to be transmitted all the way to the second multiplex/demultiplex apparatus 32, which is the apparatus at the output side of the optical interface.

In the optical interface of the present invention, as shown in FIG. 5, the signals of the main line route, that is, the OC-3 line, are terminated at the input side of the first multiplex/demultiplex apparatus 31. The path of the STS-1 signals obtained by converting the OC-3 signals and demultiplexing the same is terminated in the first multiplex/demultiplex apparatus 31. The first multiplex/demultiplex apparatus 31 and the second multiplex/demultiplex apparatus 32 are connected by a 6 Mbps optical line (23), by which the main line route and the output side (32) are connected by the paths of the VT1.5 signals and the VTG signals. The DS1 signal path is connected in the same way as in the past.

In this way, the path of the VT1.5 signals and the path of the VTG signals are not disconnected in the optical interface, but are connected all the way up to the side closest to the subscriber, so it is possible to transmit information using overhead signals between end points of the paths and it becomes possible to construct a maintenance line based on this information and to construct a backup line by route switching.

Figure 6:
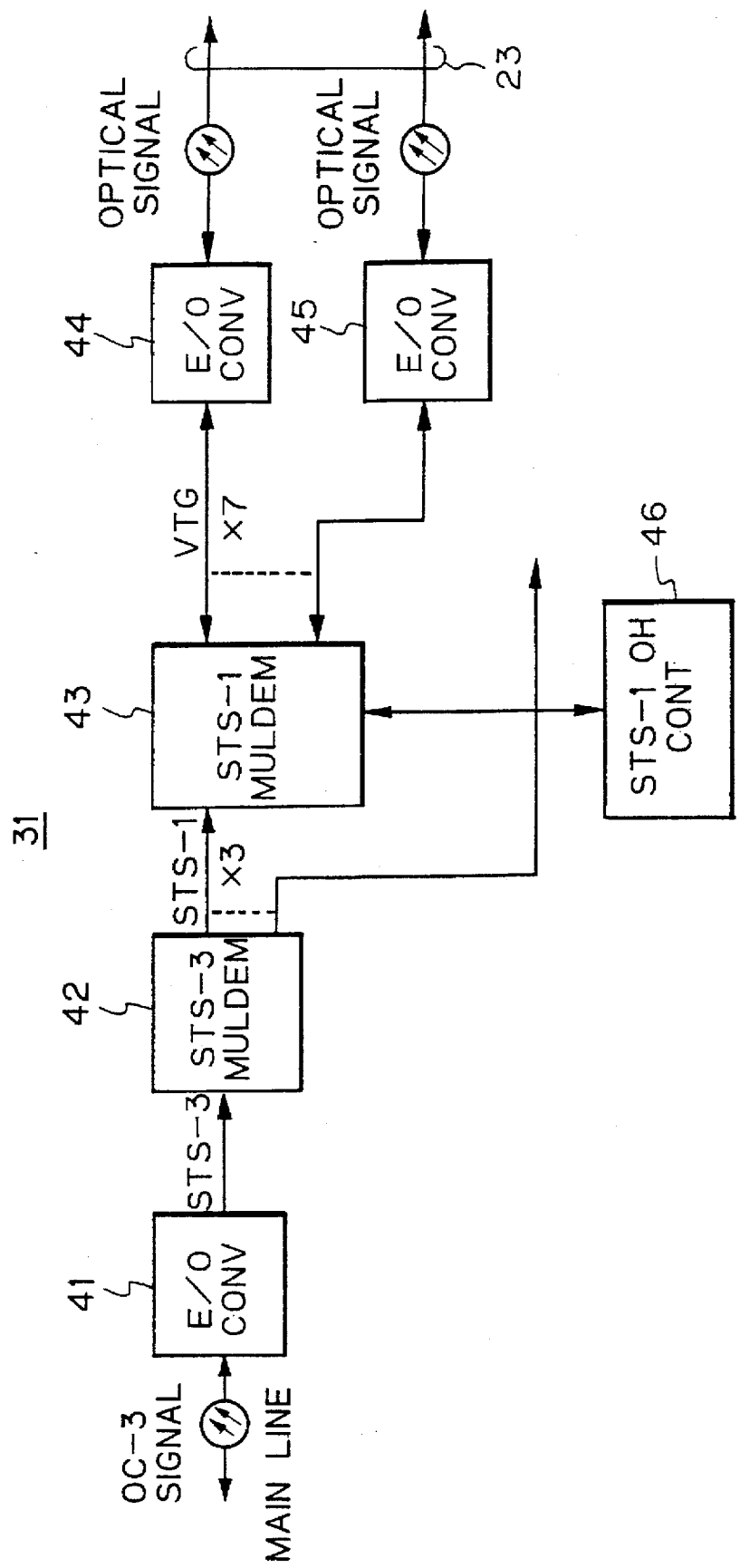
FIG. 6 is a block diagram showing more specifically the first multiplex/demultiplex apparatus shown in FIG. 5.

FIG. 6 is a block diagram showing more specifically the first multiplex/demultiplex apparatus shown in FIG. 5. The first multiplex/demultiplex apparatus 31 is comprised of an electrical/optical conversion unit (E/O CONV) 41 for converting between OC-3 signals and STS-3 signals in a SONET system, an STS-3 multiplex/demultiplex unit (STS-2 MULDEM) 42 for multiplexing/demultiplexing between the STS-3 signals and STS-1 signals in the SONET system, an STS-1 multiplex/demultiplex unit (STS-1 MULDEM) 43 for multiplexing/demultiplexing between the STS-1 signals and the VTG signals, an electrical/optical conversion unit (E/O CONV) 44 (45) for converting between the VTG signals and the optical signals (6 Mbps), and an STS-1 overhead control unit (STS-1 OH CONT) 46 for controlling the insertion/extraction of overhead signals in the STS-1 multiplex/demultiplex unit 43.

Figure 7:
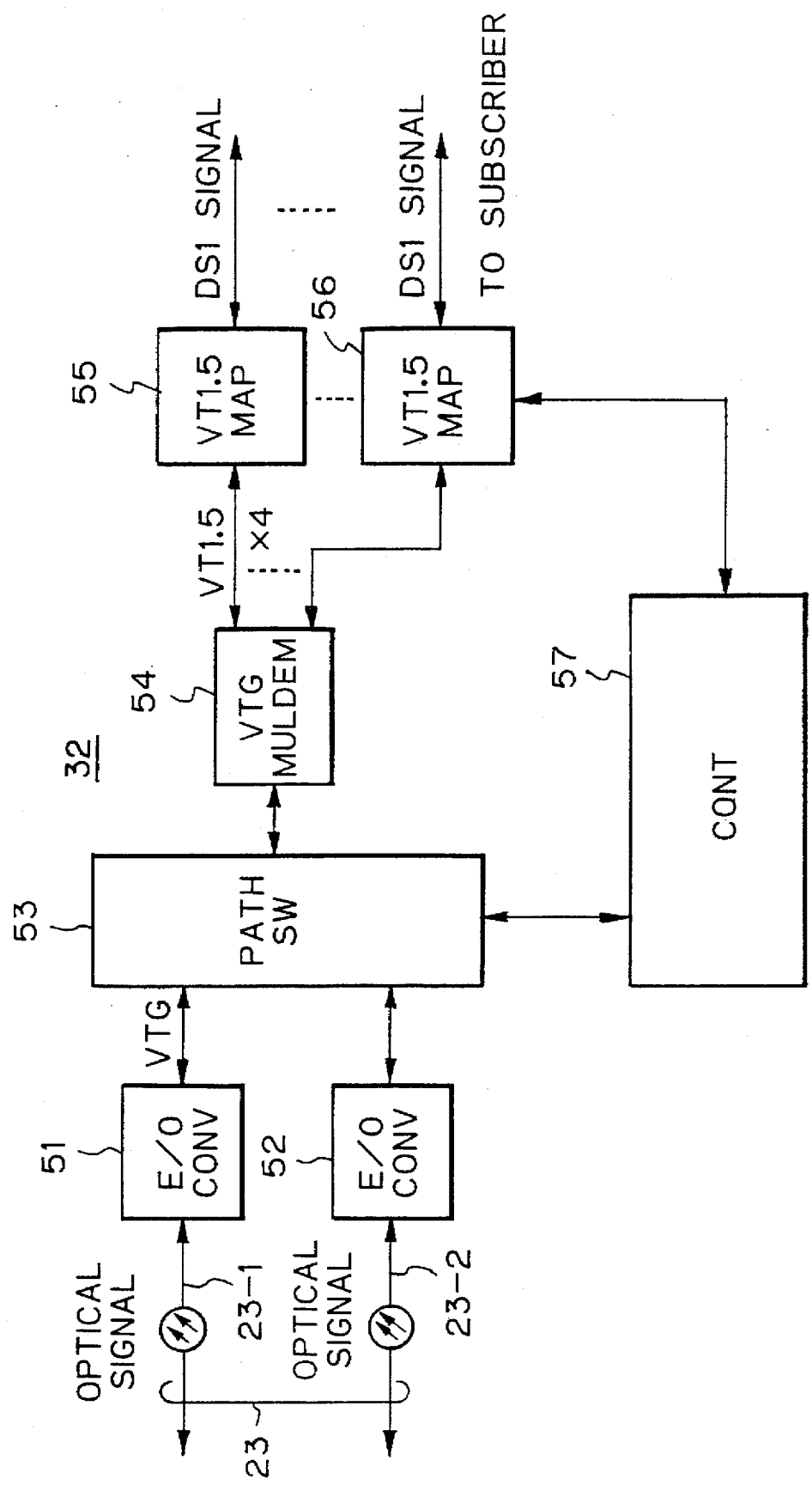
FIG. 7 is a block diagram showing more specifically the second multiplex/demultiplex apparatus shown in FIG. 2.

FIG. 7 is a block diagram showing more specifically the second multiplex/demultiplex apparatus shown in FIG. 5.

The second multiplex/demultiplex apparatus 32 is comprised of an electrical/optical conversion unit (E/O CONV) 51 (52) for converting between the optical signals (6 Mbps) and the VTG signals, a VTG multiplex/demultiplex unit (VTG MULDEM) 54 for multiplexing/demultiplexing between the VTG signals and VT1.5 signals in the SONET system, VT1.5 mapping units (VT MAP) 55, 56 for converting between the VT1.5 signals and digital electrical signals (DS1) of the plurality of subscriber side lines, and a control unit (CONT) 57 for controlling the conversion of formats in the VT1.5 mapping units 55, 56 and the insertion/ extraction of the overhead signals.

The first multiplex/demultiplex apparatus 31 shown in FIG. 6 is provided with an additional electrical/optical conversion unit 45 which converts between the VTG signals and the optical signals. Further, the second multiplex/demultiplex apparatus 32 shown in FIG. 7 is further provided with an additional electrical/optical conversion unit 52 which converts between the optical signals and the VTG signals and a path switch (PATH SW) 53 which selects one of the additional electrical/optical conversion unit 52 or the electrical/optical conversion unit 51 in the second multiplex/demultiplex apparatus 32 and connects the same to the VTG multiplex/demultiplex unit 54; and the control unit 57 controls the selection of one of the two electrical/optical conversion units 51, 52 by this path switch 53 and thereby switches between the two optical signal paths 23-1 and 23-2 formed between the first and second multiplex/demultiplex apparatuses 31, 32.

In this way, in the optical interface of the present invention, the overhead signals are not terminated at the first multiplex/demultiplex apparatus 31, but are transferred to and from the second multiplex/demultiplex apparatus 32 and are terminated at the second multiplex/demultiplex apparatus 32, so the overhead signals can be transmitted through the optical signals between the first multiplex/demultiplex apparatus 31 and the second multiplex/demultiplex apparatus 32. Therefore, according to the present invention, there is provided an optical interface for converting lower signal level signals of an OC-3 transmission apparatus into optical signals and transmitting the same, wherein it is possible to transmit overhead signals and therefore to construct a maintenance line and backup line using the overhead signals under the control of the path switch 53. The control of the path switch 53 by the control unit 57 in the second multiplex/demultiplex apparatus 32 is performed based on a path switch command displayed in the overhead signals transmitted from the main line side.

The path switch command displayed by the overhead signals is a command issued for maintaining the SONET signal or a command issued when switching paths between the two optical signal paths when they are used as a current path and backup path.

Figure 8:
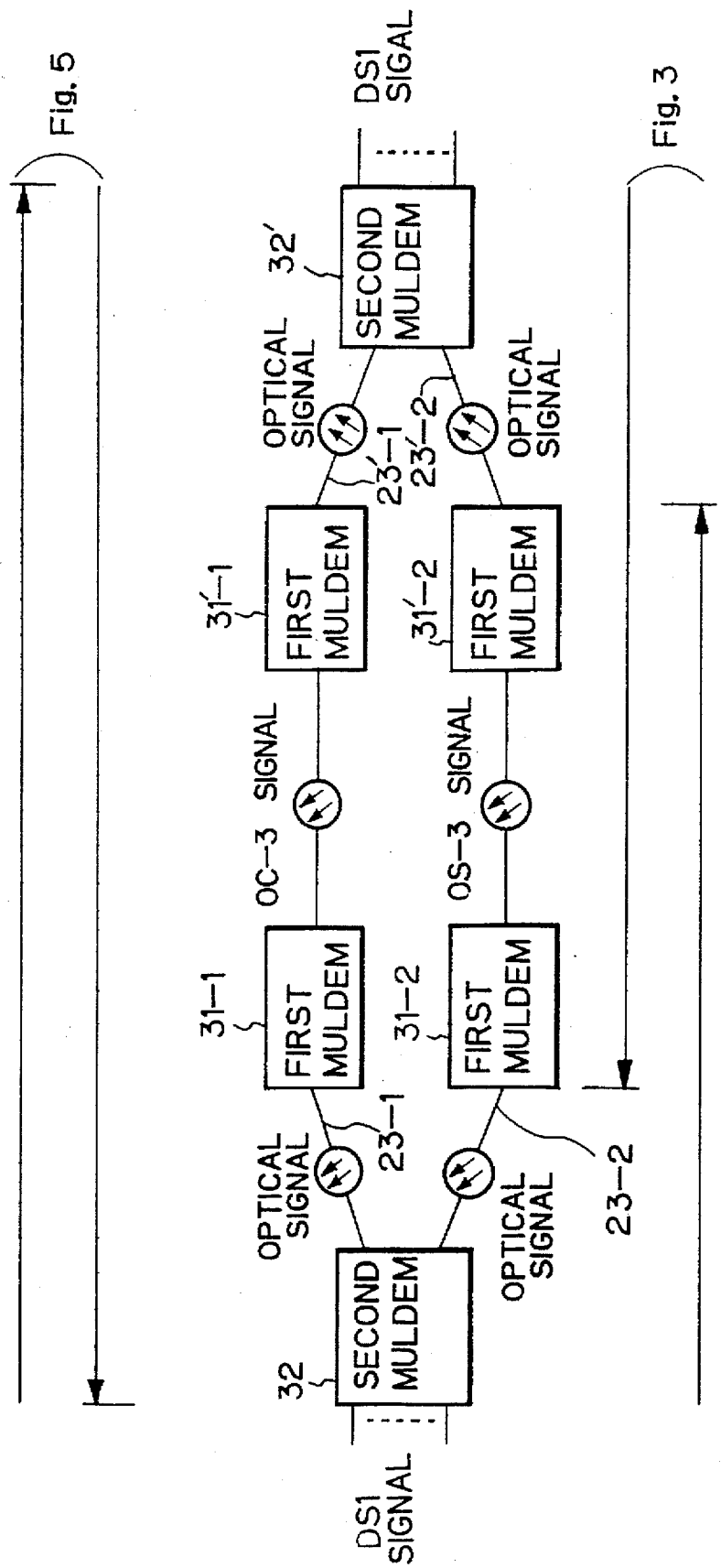
FIG. 8 is a view of a duplex transmission system using the present invention.

FIG. 8 is a view of the duplex transmission system using the present invention, wherein 31, 31' are first multiplex/demultiplex apparatuses and 32, 32' are second multiplex/demultiplex apparatuses.

The opposing two second multiplex/demultiplex apparatuses 32 and 32' have the constructions shown in FIG. 7 and convert between a plurality of DS1 signals and two route (23-1, 23'-1 and 23-2, 23'-2) 6 Mbps optical signals. Further, the four first multiplex/demultiplex apparatuses 31, 31' have the constructions shown in FIG. 6 and perform multiplexing/demultiplexing and conversion between the OC-3 signals and 6 Mbps optical signals.

In the construction of FIG. 8, the DS1 signals at the two ends (right end and left end in the figure) are connected to duplexed 6 Mbps optical lines (23, 23') through the second multiplex/demultiplex apparatuses 32, 32' and the 6 Mbps optical lines are connected through the first multiplex/demultiplex apparatuses 31, 31' transmitting the OC-3 signals, so it is possible to switch routes by path switching in the second multiplex/demultiplex apparatuses 32, 32'. Therefore, according to the embodiment of FIG. 8, it becomes possible to provide relief when there is a disconnection or other fault in the optical transmission line of one route for transmitting the 6 Mbps optical signals or OC-3 signals by using the other route.

In FIG. 8, the pair of arrows facing different directions indicate the span of the overhead signals transmitted from one of the second multiplex/demultiplex apparatuses to the other of the second multiplex/demultiplex apparatuses. The pair of arrows shown at the top of FIG. 8 show the span when use is made of the construction of FIG. 5 (present invention), while the pair of arrows at the bottom of FIG. 8 show the span when using the conventional construction of FIG. 3.

As explained above, according to the present invention, it is possible to transmit overhead signals in an optical interface for converting lower signal level signals of an OC-3 transmission apparatus into optical signals and transmitting the same, so it becomes possible to construct a maintenance line using the overhead signals and to construct a backup line by route switching using the overhead signals.

What is claimed is:

1. An optical interface between a main line and a subscriber line in a SONET system, the optical interface comprising:

a first transforming means for performing multiplexing/demultiplexing between higher level optical signals of a main line side thereof and lower level electrical signals of a subscriber side thereof, said lower level electrical signals inherently containing overhead signals, said means performing both first electrical/optical conversion between lower level electrical signals and higher level optical signals and second electrical/optical conversion between lower level electrical signals and relaying optical signals, said higher level optical signals containing said overhead signals from said lower level electrical signals;

an optical transmission line connected to said first transforming means, for receiving and transmitting said relaying optical signals which contain said overhead signals therein; and a second transforming means connected to said first transforming means via said optical transmission line, for performing multiplexing/demultiplexing between said relaying optical signals containing said overhead signals received from said first transforming means and a plurality of subscriber side line digital electrical signals;

said second transforming means including means for performing insertion/extraction of said overhead signals.

2. An optical interface as set forth in claim 1, wherein said lower level electrical signals converted to optical signals are VTG signals of the SONET system.

3. An optical interface as set forth in claim 2, wherein a single VTG multiplex/demultiplex unit is provided in said second transforming means.

4. An optical interface as set forth in claim 3, wherein said second transforming means further comprises:

a first electrical/optical conversion unit for converting between said optical signals and said VTG signals, a VTG multiplex/demultiplex unit for multiplexing/demultiplexing between said VTG signals and VT1.5 signals in the SONET system, VT1.5 mapping units for converting between said VT1.5 signals and digital electrical signals of the plurality of subscriber side lines, and a control unit for controlling the conversion of formats in the VT1.5 mapping units and the insertion/extraction of said overhead signals.

5. A optical interface as set forth in claim 4, wherein said first transforming means comprises:

a first electrical/optical conversion unit for converting between OC-3 signals and STS-3 signals in the SONET system, an STS-3 multiplex/demultiplex unit for multiplexing/demultiplexing between said STS-3 signals and STS-1 signals in the SONET system, an STS-1 multiplex/demultiplex unit for multiplexing/demultiplexing between said STS-1 signals and said VTG signals, a second electrical/optical conversion unit for converting between said VTG signals and said optical signals, and an STS-1 overhead control unit for controlling the insertion/extraction of overhead signals in said STS-1 multiplex/demultiplex unit.

6. An optical interface as set forth in claim 5, wherein:

said first transforming means further comprises a third electrical/optical conversion unit which converts between said VTG signals and said optical signals;

said second transforming means further comprises a second electrical/optical conversion unit for converting between said optical signals and said VTG signals, and a path switch for selecting one of the second electrical/optical conversion unit of said second transforming means and the first electrical/optical conversion unit of said second transforming means and connecting the selected electrical/optical conversion unit to said VTG multiplex/demultiplex unit; and said control unit controls the selection of one of the first and second electrical/optical conversion units of said second transforming means by said path switch and thereby switches between two optical signal paths formed between said first and second transforming means.

7. An optical interface as set forth in claim 6, wherein the control of the path switch by said control unit in said second transforming means is performed based on a path switch command given by said overhead signals transmitted from said main line side.

8. An optical interface as set forth in claim 7, wherein said path switch command given by said overhead signals is a command issued for maintaining the SONET signal or a command issued when switching paths between said two optical signal paths when they are used as a current path and backup path.

* * * * *